Jan. 17, 1956 J. C. GARROTT 2,731,231
RESILIENT SEAL VALVE
Filed April 10, 1951 4 Sheets-Sheet 1

INVENTOR
JOHN C. GARROTT.
BY
Lester B Clark
ATTORNEY

Jan. 17, 1956 J. C. GARROTT 2,731,231
RESILIENT SEAL VALVE
Filed April 10, 1951 4 Sheets-Sheet 2

INVENTOR
JOHN C. GARROTT.

BY Lester B Clark.
ATTORNEY

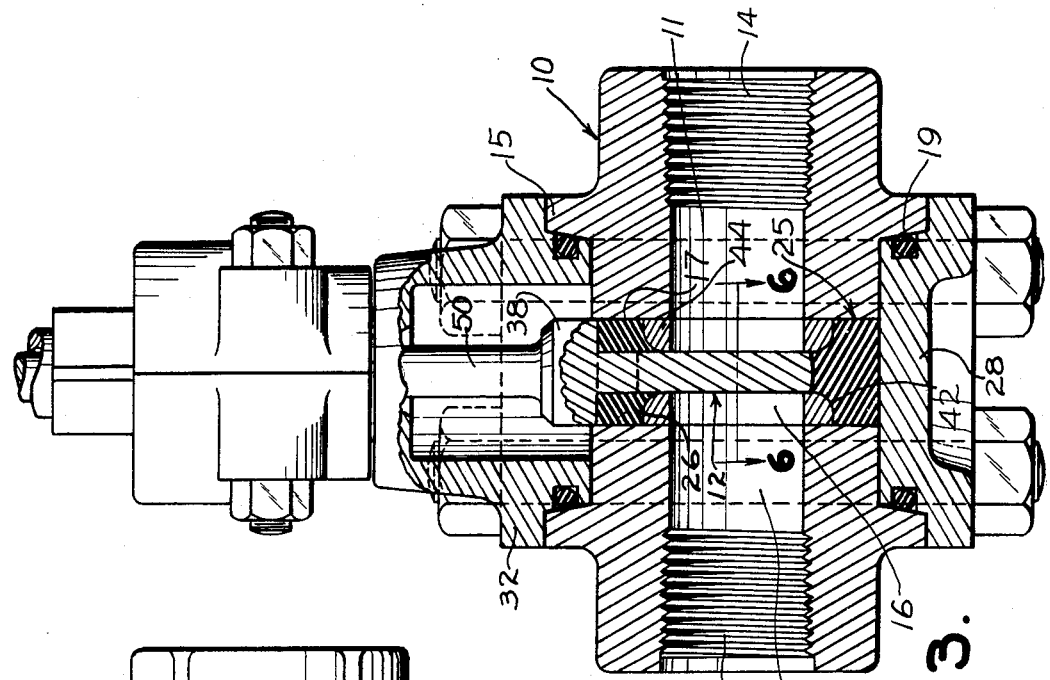

Jan. 17, 1956
J. C. GARROTT
2,731,231
RESILIENT SEAL VALVE
Filed April 10, 1951
4 Sheets-Sheet 4
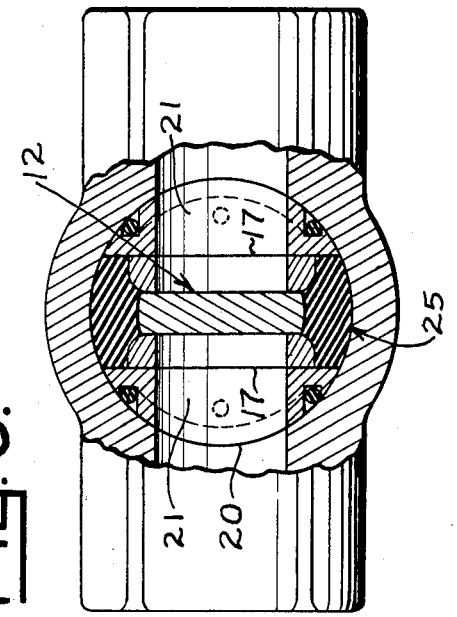
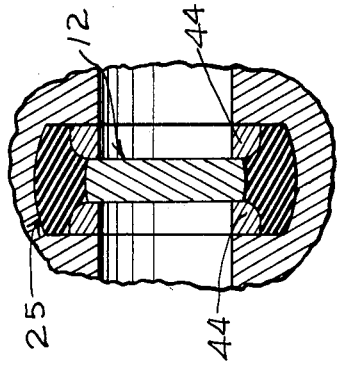
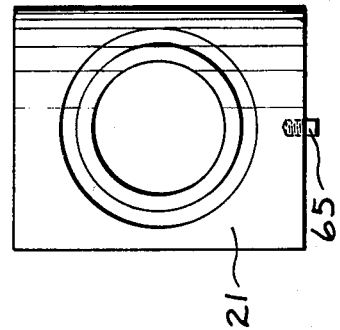
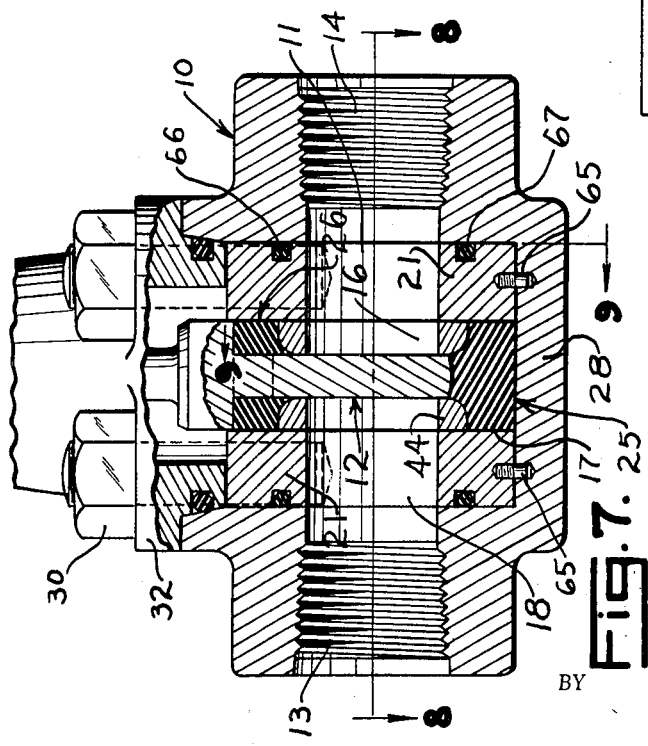
INVENTOR
JOHN C. GARROTT.
BY
Lester B Clark.
ATTORNEY

United States Patent Office 2,731,231
Patented Jan. 17, 1956

2,731,231

RESILIENT SEAL VALVE

John C. Garrott, Houston, Tex.

Application April 10, 1951, Serial No. 220,289

6 Claims. (Cl. 251—328)

This invention relates to a valve for closing a pipe, and is particularly directed to a gate valve which can be readily assembled and disassembled without moving the pipes or interfering with the pipes connected to the valve body.

This invention relates to the type of valve shown generally in U. S. Patent 2,401,123 granted to Alexander S. Volpin on May 28, 1946.

It is one of the objects of this invention to provide a valve wherein there is a minimum of frictional contact between the metal gate and the resilient valve seat.

Another object of this invention is to provide a valve in which the valve has a tongue-shaped gate to provide a narrow closing area with a valve seat.

It is another object of this invention to provide on a valve a bonnet which engages a lower valve sealing member to prevent upward movement of the lower sealing member to thereby aid in sealing the upper end of the gate chamber about the gate.

A further object of this invention is to provide a valve wherein the wearing parts such as sealing members and wearing rings are removable and quickly and easily replaceable without disconnecting the inlet and outlet pipes to the valve housing.

An additional object is to provide a gate valve wherein a two-piece sealing seat of resilient material is within a valve housing, the valve being closed by contact of a narrow tongue-shaped gate with the lower member of the sealing seat and by the upper sealing seat sliding within the lower member by pressure from a head portion on the upper part of the gate.

Still a further object of this invention is to provide an upper sealing member having portions which fit within two recesses in a tongue-shaped valve gate and a head portion at its upper part which fits below the upper shoulder of the valve housing when the valve is in closed position so that the upper sealing member will be confined by the metal of the valve gate head and the walls of the valve housing causing the rubber of the upper sealing member to flow under compression into sealing engagement with a lower sealing seat, but the upper seal being incapable of flow in any other direction.

Other and further objects of the invention will be readily apparent when the following description is considered in connection with the accompanying drawings wherein:

Fig. 3 is a longitudinal section to illustrate the gate in closed position.

Fig. 4 is a section taken on line 4—4 of Fig. 2.

Fig. 5 is a perspective view of the gate and the two-piece sealing seat members.

Fig. 6 is a section taken on line 6—6 of Fig. 3.

Fig. 7 is a side elevation, partly in section, of a modification of the valve shown in Figs. 1–6, illustrating the removable flow ports in the valve housing.

Fig. 8 is a section on line 8—8 of Fig. 7.

Fig. 9 is a side elevation of a removable flow port.

A detailed description of the invention in connection with the drawings follows wherein like reference numerals refer to like parts in all figures of the drawings.

Figure 1:
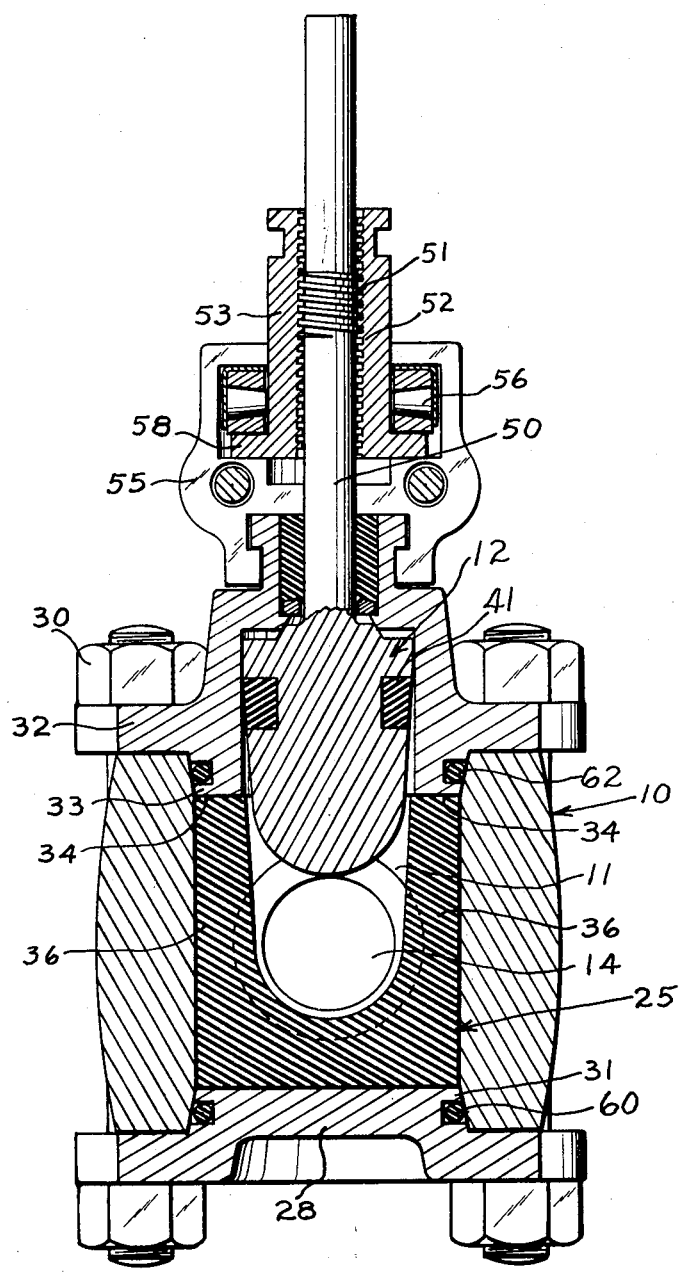
Fig. 1 is a transverse vertical sectional view of the valve with the gate in open position.

In Figs. 1, 2, 3, and 7, a valve housing 10 is shown wherein a tongue-shaped gate or valve tongue 12 is used to close the outlet opening 13 and inlet opening 14 located on opposite sides of the gate chamber 11 and connected by a flow passage 18. Of course, either opening 13 or 14 may be used for inlet or outlet connections. Openings 13 and 14 are threaded to receive desired pipe or fittings.

Valve housing 10 has therein a lateral passage or channel 16, best seen in Fig. 3, which is formed by substantially parallel walls 17. Channel 16 thus forms a slot for receiving a U-shaped gasket 25, wearing rings 44 and a sealing washer 26 on valve gate 12. Parallel walls 17 may be at angles other than perpendicular to annular passage 18, but preferably walls 17 are substantially perpendicular to passage 18.

Valve housing 10 also has lip portion 15 on the top thereof and a lip portion 19 on the bottom thereof. Lip portion 15 may have internal threads, if desired, to receive corresponding threads on the outer surface of a bonnet 32; likewise, lip portion 19 may be threaded internally to receive a bottom 28, which may have threads, if desired. It is to be noted that neither bonnet 32 nor bottom 28 are shown with threads.

To obtain a minimum of sealing area so that the minimum force is needed to overcome a particular pressure in the passage 18, the gate 12 has been made to have a narrow, flat tongue-shaped configuration. Also a resilient lower sealing means or U-shaped gasket 25 and an upper sealing means or integral substantially rectangular sealing washer 26 provide a two-piece upper and lower seal. Gasket 25 and washer 26 are separate, gasket 25 fitting between walls 17 and on bottom 28. The arms 36 of gasket 25 extend upwardly along the end walls of channel 16 above passage 18.

Bottom 28 is a dish-shaped plate which has a shoulder 31 adapted to engage the inner surface of lip 19 of valve housing 10. Holes are provided in bottom 28 to receive holding means 30; holding means 30 may be in the form of nuts and bolts as shown in the accompanying drawings. The holding means 30 extends upwardly to receive a bonnet 32 so that a clamping action results to hold bonnet 32 and bottom 28 to valve housing 10.

As mentioned before, bottom 28 may be held by threads on the external surface of shoulder 31 so as to engage with corresponding threads on the lip 19 on the inside of valve housing 10. The bonnet 32 is shown as being fixed to valve chamber 10 by holding means 30; instead, as mentioned before, bonnet 32 may be held by threads provided on the external face of shoulder 33 for engagement with threads on the lip 15 or valve housing 10. Bonnet 32 engages the tops 34 of arms 36 of U-shaped gasket 25 so as to prevent gasket 25 from moving upwardly away from bottom 28.

Figure 2:
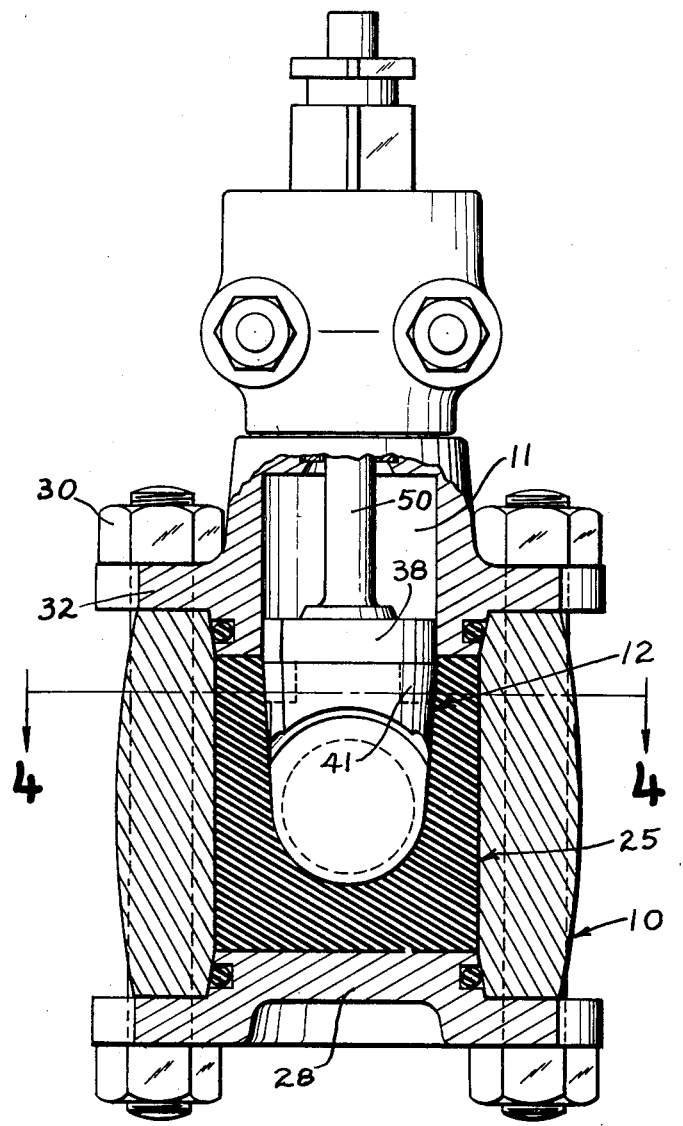
Fig. 2 is a view similar to Fig. 1 with the gate in closed position.

Tongue 12 has a head section 38 on its upper portion; this section 38 is substantially rectangular in shape, the longer sides 39 being parallel to each other and to the flat side 35 of tongue 12. The longer sides 39 overhang and extend beyond the flat side 35 so as to form an abutment for sealing washer 26. The ends 43 of head section 38 do not extend beyond the plane of the curved portion 45 of tongue 12, but two recesses 41, best seen in Figs. 1 and 2, are provided immediately below ends 43 to receive the curved ends 27 of washer 26, as best seen in Fig. 1, so that there is an abutment for the entire upper part of washer 26. Thus, washer 26 must be stretched to slide over curved portion 45 and into recesses 41; when in recesses 41, the engagement of end portions 27 in recesses 41 will lock washer 26 to head section 38 and head section 38 prevents movement of washer 26 upwardly so it can be seen washer 26 will not move after placement on tongue 12. The overhanging sides 39 and the upper walls of recesses 41 will form a continuous abutment engaging the upper end face of washer 26 and concentric therewith. It will be seen from the several figures that the width of side portions 39 and the depth of recesses 41 will be so dimensioned with respect to the thickness of washer 26 that when the latter is in place beneath head 38, the outer periphery of head 38 will be substantially flush with that of washer 26.

The washer 26 engageably fits within U-shaped gasket 25 when tongue 12 is lowered into sealing contact with gasket 25. Washer 26 and gasket 25 are made of rubber or synthetic materials such as "Hycar," "Neoprene," or "Teflon"; almost any resilient material can be used depending upon the materials being handled. The curved surface 45 of tongue 12 extends from the bottom of one recess 41 to the other recess 41 and is of such a contour that it forms a continuous line with rubber washer 26 and head section 38 when washer 26 is in place. The slope of curved surface 45 is such that it does not contact the inner surfaces of the arms 36 of U-shaped gasket 25 until gate 12 reaches its closed position by contact of its lower curved end with seal portion 35a of gasket 25. Thus, there is practically no wear on gasket 25 by the movement of metal tongue 12 to and from its closed position, since the frictional contact between washer 26 and gasket 25 is thus very slight. The fluid-tight seal is obtained by deformation and plastic flow of the rubber under compression by the head 38 of tongue 12, more fully described hereinafter.

In order to prevent gasket 25 from squeezing closed, grooves 42 are provided on the opposite side faces of gasket 25 to receive removable wearing rings 44 which are dimensioned so that their outer ends are flush with the outer side faces of gasket 25 and bear against slot walls 17 concentrically about the inner ends of openings 13 and 14. The inner ends of rings 44 are spaced apart for sliding engagement with the opposite side faces 35 of tongue 12. The peripheries of rings 44, being thus inserted in the side faces of gasket 25, will thereby be surrounded in large part by arms 36 and the bottom portion of gasket 25. The portions of the rings extending between the upper portions of arms 34 will be engaged by the lower side faces of washer 26 when the latter is moved downwardly between arms 36 by downward movement of tongue 12 to its closed position on bottom seal portion 35a in gasket 25. Thus rings 44 will serve to rigidify gasket 25 and, being completely surrounded peripherally by the resilient plastic material comprising gasket 25 and washer 26, will, in effect, float therein, that is, the rings 44 are free to move slightly in a plane generally parallel to walls 17 in response to deformation of the surrounding resilient material under pressure. At the same time, the resilient material composing gasket 25 and washer 26 will form a plastic seal about the periphery of rings 44.

It can be seen in Fig. 3 particularly that the upper face of head portion 38 of tongue 12 in its closed position is slightly below the top of valve chamber 10; such an arrangement prevents washer 26 from being forced upwardly out of passage 16 by a fluid pressure.

When tongue 12 is in the closed position it will be effectively sealed against leakage of fluid along its tapered edges and about its curved lower end by compressive engagement of these elements with the inner faces of arms 36 and seal portion 35a. Tongue 12 will be sealed above passage 18 by means of washer 26 which annularly surrounds the upper portion of the tongue, as shown, by entry of the washer into the upper portion of slot 16 and between the upper ends of arms 36. In this position end portions 27 of the washer will sealingly engage the inner faces of the upper ends of arms 36, while the side portions of washer 26 will engage the adjacent walls 17 of slot 16. Thus, as best seen in Fig. 4, the upper portion of tongue 12 will be circumferentially enclosed by a plastic seal which is annularly confined between the exterior surfaces of tongue 12 and the opposed metal surfaces of walls 17 and the ends of slot 16. The side faces of tongue 12 will be effectively sealed about passage 18 by the previously described plastic seals formed about the outer peripheries of rings 44 by the adjacent portions of gasket 25 and washer 26 and confined on opposite sides between walls 17 and the adjacent side faces of tongue 12. The upper circumferential seal about tongue 12 formed by washer 26 and the upper ends of arms 36 will be confined against upward movement by the metallic surfaces formed by bonnet 32 and head 38.

Washer 26 is thus entirely confined by metal when tongue 12 is in its closed position with the exception of its curved ends 27 which fit within the arms 36 of the rubber gasket 26, as seen in Figs. 4 and 5. This confinement of the rubber washer 26 is an essential feature of this invention since as an increased force is applied to head portion 38, washer 26 will receive the full effect of the increased compression because of the fact that it is confined by metal, as best seen in Fig. 3 and as previously described. This compression will result in a plastic flow of the rubber in washer 26 and gasket 25 between the several confining metal surfaces to thereby effectively seal all parts of the gate structure. It is believed readily apparent that the seal is far superior to any previously obtainable with known structures.

A stem 50 is secured to the tongue 12 and may be integral therewith or may be removably secured by a pin (not shown) or similar known attaching devices. Stem 50 has threads 51 and engages with threads 52 of guide 53. Guide 53 fits within housing 55 as seen in Fig. 1. Bearings 56 are provided above the lower shoulder 58 of guide 53.

Annular resilient gaskets 60 and 62 may, if desired, be located on shoulders 31 and 32, respectively. In the threaded modification of shoulders 31 and 32, before described, these annular gaskets 60, 62 ordinarily will not be needed.

In the modification shown in Figs. 7–9, valve chamber 10 comprises a cylindrical bore 20 and two removable flow ports 21 composed of semi-cylindrical segments to fit in bore 20 and having opposing parallel walls 17 to provide the channel 16 similar to that of Figs. 1–6. The flow ports 21 are held in position by dowels 65 which fit into a hole in bottom 28 of valve chamber 10. Also, flow ports 21 are engaged at their tops by the bottom of bonnet 32. It will be observed that bottom 28 is an integral part of the valve chamber 10; it is also believed obvious that the modification of Figs. 1–6 could employ an integral bottom 28. Annular resilient gaskets 66 and 67 are provided in the outer faces of flow ports 21 surrounding the passages therein which register with inlet and outlet ports 13 and 14. The modification of Figs. 7–9 is particularly desirable in small sizes of valves where machining is difficult, but of course is not limited to any particular size of valves.

It is believed readily apparent that when the threads 13, 14 are connected with a long length of cumbersome pipe or other fittings, the parts such as U-shaped gasket 25, sealing washer 26, rings 44 and tongue 12 may be quickly and easily removed and replaced without the necessity of breaking the valve from the pipe connections.

Broadly, this invention contemplates a valve construction in which worn parts can be readily replaced without removal of the valve from the pipe connections, which construction includes a gate of minimum area so that a maximum of pressure can be obtained with a minimum of force on the valve stem.

What is claimed is:

1. A gate valve, comprising, a valve housing having inlet and outlet openings therein, a gate chamber between said openings, a stem having an elongated tongue-shaped gate thereon, said gate being movably mounted in the housing for engaging a valve seat in said chamber and thereby closing said openings, said valve seat including a resilient U-shaped gasket seated on the bottom of said gate chamber and confined between the side and end walls thereof, a substantially rectangular resilient sealing washer circumferentially surrounding the body of the gate below its upper end, said washer engageably fitting between the arms of said U-shaped gasket and the side walls of said chamber when the gate is in contact with the bottom of the U-shaped gasket, a pair of removable wear rings seated in opposite side faces of said gasket encircling said openings and slidably engageable by the side faces of said gate when the latter is moved to the closed position, the peripheries of said rings being enclosed by said gasket and by the side portions of said washer when the gate is in the closed position, and abutment means on the gate confining the upper end of said washer, so that a closing force exerted upon said gate will cause said gasket and washer to flow into a fluid-tight seal about said gate and said rings.

2. In a gate valve having a gate chamber therein and a flat tongue-shaped gate reciprocable in the chamber, means for sealing between the gate and the walls of the chamber, comprising, a generally U-shaped resilient gasket seated on the bottom of the chamber and confined between the side and end walls thereof and positioned to seal between the inner end and longitudinal side edges of the gate and the adjacent walls of the gate chamber when the gate is moved inwardly to a valve-closing position, an annular resilient washer surrounding the upper portion of the gate positioned to be inserted between the arms of the U-shaped gasket and to form an annular seal between the gate faces and the adjacent walls of the gate chamber when the gate is closed, shoulder means about the gate above the washer having close sliding fit with the walls of the gate chamber forming confining abutments for the washer, and a pair of metal wear rings removably seated in the side faces of said gasket and extending between the side walls of the chamber and the adjacent faces of the gate when the latter is closed, said rings being peripherally surrounded by the U-shaped gasket and the inserted portions of said washer when the gate is closed, so that a closing force exerted upon said gate will cause said gasket and washer to flow into a fluid-tight seal about said gate and said rings.

3. In a gate valve having a flow passage therethrough, a gate chamber intersecting said passage and a flat elongated tongue-shaped gate reciprocable in the chamber to open and close said passage, means for sealing about the gate in its closed position, comprising, a U-shaped resilient gasket seated in the chamber confined between the side and end walls thereof to receive and seal about the inner end and longitudinal edges of the gate, an annular resilient washer circumferentially seated about the upper portion of the gate for insertion by closing movement of the gate between the arms of the U-shaped gasket to form a seal between the gasket, the sides of the inserted gate and the side walls of the gate chamber, and removable metallic wear rings seated in the opposite side faces of said U-shaped gasket extending between the side walls of the chamber about said passage and the opposed side faces of the gate in the closed position, the peripheries of said rings being enclosed by said gasket and the portions of said washer inserted between the arms of the gasket when the gate is closed, and abutment means on the gate confining the upper end of said washer so that a closing force exerted upon said gate will cause said gasket and washer to flow into a fluid-tight seal about said gate and said rings.

4. A gate valve, comprising, a casing having a flow passage therethrough, a narrow rectangular gate chamber defined by spaced parallel side walls intersecting said passage, a flat elongated tongue-shaped gate reciprocable in said gate chamber to open and close said passage, laterally extending enlargements on opposite sides of the upper portion of said gate receivable in a close sliding fit between said side walls when the gate is moved to the closed position, and means for sealing about said gate when in the closed position, said means comprising, a generally flat U-shaped resilient gasket seated in the chamber confined between the side and end walls thereof to receive and seal about the inner end and longitudinal edges of the gate, an annular resilient washer circumferentially seated about the gate beneath said enlargements for insertion by the closing movements of the gate between the arms of the U-shaped gasket to form a seal between the gasket, said side walls and the opposed faces of the closed gate, and removable metallic wear rings seated in the opposite side faces of said gasket and extending between said side walls about said passage and the opposed side faces of the closed gate, the peripheries of said rings being enclosed by said gasket and the portions of said washer inserted between the arms of the gasket when the gate is closed and abutment means on the gate confining the upper end of said washer, so that a closing force exerted upon said gate will cause said gasket and washer to flow into a fluid-tight seal about said gate and said rings.

5. In a gate valve having a narrow generally rectangular gate chamber defined by spaced parallel side walls and a flat elongated tongue-shaped gate insertible in said chamber between said walls, means for sealing between said gate and said walls, comprising, a resilient generally U-shaped gasket confined between the side and end walls of said chamber having its base seated on the bottom of said chamber and its arms extending upwardly along the end walls of said chamber to seal between the bottom and end walls of said chamber and the inner end and adjacent edges of said gate, a resilient generally rectangular washer surrounding the upper portion of said gate member below its upper end and insertible therewith between the upper ends of said arms to form a circumferential seal between the upper portion of said gate, the upper ends of said arms and the side walls of said chamber when the gate is moved to the closed position, abutment means on the gate body confining the upper end of said washer and extending between the side faces of said gate and said side walls, and a pair of wear rings removably mounted in the side faces of the gasket extending between the side walls of said chamber and the side faces of the gate when the latter is closed, said rings being peripherally surrounded by the U-shaped gasket and the portions of the washer inserted between the arms of the gasket when the gate is closed, so that a closing force exerted upon said gate will cause said gasket and washer to flow into a fluid-tight seal about said gate and said rings.

6. In a gate valve, a cylindrical bore, removable flow ports composed of cylindrical segments having flat parallel inner faces disposed in said bore in spaced-apart relation to define a narrow gate chamber extending transversely of said bore, a flat tongue-shaped gate insertible into said chamber, laterally extending enlargements on opposite sides of the upper portion of said gate receivable in close sliding engagement between said inner faces of said segments when the gate is moved to the closed position therein, and sealing means for sealing about said gate in said chamber, said sealing means, comprising, a resilient U-shaped gasket confined between the side and end walls of said chamber having its base seated on the bottom of said chamber and having its arms extending upwardly therein to seal about the longitudinal edges and lower end portion of said gate when the gate is moved to the closed position, and a resilient generally rectangular washer circumferentially surrounding the upper portion of said gate beneath said enlargements and in abutting engagement therewith said washer being receivable between the upper ends of said arms and between the inner faces of said segments and the opposite side faces of said gate when said gate is moved downwardly in said chamber into contact with the base of said gasket to thereby seal about the upper portion of said gate, and removable metallic wear rings seated in the opposite faces of said gasket extending between the inner faces of said segments and the opposed side faces of the closed gate, the peripheries of said rings being enclosed by said gasket and the portions of said washer inserted between the arms of the gasket when the gate is closed, so that a closing force exerted upon said gasket and washer to flow into a fluid-tight seal about said gate and said rings.

References Cited in the file of this patent

UNITED STATES PATENTS

| | | |
|---|---|---|
| 2,194,261 | Allen | Mar. 19, 1940 |
| 2,194,262 | Allen | Mar. 19, 1940 |
| 2,194,264 | Abercrombie | Mar. 19, 1940 |
| 2,238,357 | Allen | Apr. 15, 1941 |
| 2,401,123 | Volpin | May 28, 1946 |
| 2,510,442 | Volpin | June 6, 1950 |

FOREIGN PATENTS

| | | |
|---|---|---|
| 447,495 | Great Britain | of 1936 |